United States Patent [19]

Komori et al.

[11] Patent Number: 5,555,345
[45] Date of Patent: Sep. 10, 1996

[54] LEARNING METHOD OF NEURAL NETWORK

[75] Inventors: Yasuhiro Komori; Shigeki Sagayama, both of Kyoto, Japan

[73] Assignee: ATR Interpreting Telephony Research Laboratories, Kyoto, Japan

[21] Appl. No.: 845,096

[22] Filed: Mar. 3, 1992

[30] Foreign Application Priority Data

Mar. 25, 1991 [JP] Japan ..................................... 3-060170

[51] Int. Cl.⁶ ............................... G06E 1/00; G06F 3/00; G06F 15/18; G06G 7/00
[52] U.S. Cl. .................................. 395/23; 395/20; 395/22; 395/24
[58] Field of Search .............................. 395/22, 23, 24, 395/27, 11, 61

[56] References Cited

U.S. PATENT DOCUMENTS

| | | | |
|---|---|---|---|
| 4,912,652 | 3/1990 | Wood | 364/513 |
| 5,040,230 | 8/1991 | Takatori et al. | 395/22 |
| 5,083,285 | 1/1992 | Shima et al. | 395/24 |
| 5,093,899 | 3/1992 | Hiraiwa | 395/23 |
| 5,131,073 | 7/1992 | Furuta et al. | 395/27 |
| 5,131,074 | 7/1992 | Nakamura et al. | 395/61 |
| 5,167,006 | 11/1992 | Furuta et al. | 395/11 |
| 5,287,430 | 2/1994 | Iwamoto et al. | 395/22 |

FOREIGN PATENT DOCUMENTS

| | | | |
|---|---|---|---|
| 2235170 | 7/1990 | Japan | G06F 15/18 |
| 2235141 | 9/1990 | Japan | G06F 3/16 |
| 2231670 | 9/1990 | Japan | G06F 15/18 |
| 3111897 | 5/1991 | Japan | G10L 3/00 |
| 3123969 | 5/1991 | Japan | G06F 15/38 |
| 3201027 | 9/1991 | Japan | G06F 7/00 |
| 3257573 | 11/1991 | Japan | G06F 15/18 |
| 460752 | 2/1992 | Japan | G06F 15/18 |
| 4194999 | 7/1992 | Japan | G10L 3/00 |

OTHER PUBLICATIONS

Gramss et al., "Development of Multilayer Neural Networks for Word Recognition and Reproduction", Informationstechnik, May, 1989, pp. 324–333.

*Primary Examiner*—David K. Moore
*Assistant Examiner*—Jariq Hafiz
*Attorney, Agent, or Firm*—Lowe, Price, LeBlanc & Becker

[57] ABSTRACT

The present invention is a learning method of a neural network for identifying N category using a data set consisted of N categories, in which one learning sample is extracted from a learning sample set in step SP1, and the distances between the sample and all the learning samples are obtained in step SP2. The closest n samples are obtained for each category in step SP3, and similarity for each category is obtained using the distances from the samples and a similarity conversion function $f(d)=\exp(-\alpha \cdot d^2)$. In step SP4, the similarity for each category is used as a target signal for the extracted learning sample, and it returns to an initial state until target signals for all the learning samples are determined. When target signals are determined for all the learning samples, in step SP5, the neural network is subjected to learning by the back-propagation using the learning samples and the obtained target signals.

4 Claims, 4 Drawing Sheets

LEARNING METHOD OF NEURAL NETWORK

BACKGROUND OF THE INVENTION

1. Field of the Invention

The present invention relates to a learning method of a neural network. More particularly, the present invention relates to a learning method of a neural network in which, for example, for each sample, the similarity for each phoneme category is obtained in advance according to the distance between that sample and a sample included in each phoneme category, the similarity is applied as a target signal to a neural network, and the neural network learns by the back-propagation.

2. Description of the Background Art

In a conventional learning method of a neural network, the neural network learns categories of learning samples by the back-propagation with "0" or "1". In the learning method, categories are learned directly, so that the neural network can learn to have considerably high category identifying capability for a learning set with a feature of clearly determining if it is in the category or not with "1" or "0" respectively.

On the other hand, however, when identifying a category for a data set with somewhat different feature, such as speaking rate or speaking style in speech recognition, from that of the learning set, the category identifying capability considerably decreases. Furthermore, when a neural network makes an identification mistake once, its result is outputted as "1", "0". That is, it had a disadvantage that, for example, when "white" should be determined to be "0" and "black" should be determined to be "1" it happens to make a great error, i.e. to make a determination of "1" for "white" and for "black". Furthermore, since the determinations are made with "0", "1" it has a disadvantage that, for example, in combination with higher level information such as a language model, in speech recognition and in the character recognition, information lack is likely to happen in an output of the neural network which prevents improvement of the recognition rate using the higher level information. As a result, it also had a disadvantage that a high recognition rate could not be obtained in overall system.

SUMMARY OF THE INVENTION

Accordingly, it is a main object of the present invention to provide a learning method of a neural network in which not only the recognizing rate of a first candidate but also the recognizing rate of the N'th candidate are increased. Moreover, the category recognizing ability of a data set having feature somewhat different from a learning set does not easily decrease. It also improves the overall recognition rate in combination with a higher level information.

The present invention is, briefly stated, a method of learning of a neural network in which N categories are identified using a data set consisted of N categories, in which, for each sample in the data set, the similarity for N categories is obtained in advance, and the neural network learns by the back-propagation using the similarity as a target signal.

Accordingly, according to the present invention, by previously obtaining similarity for N categories for each learning sample, the identifying rate of a first candidate and the identifying rate of an N'th candidate are both increased so that the category identifying ability for a data set having feature somewhat different from a learning set does not easily decrease. And it improves the overall recognition rate in combination with higher level information. Furthermore, since the similarity of each category is applied as a target signal in learning and learning is performed by the back-propagation, the neural network can proceed with learning without requirement of searching for an unreasonable determination boundary for identifying categories, resulting in considerably faster learning in comparison with a conventional method.

In a more preferable embodiment of the present invention, when obtaining similarity in advance for all of the N categories for each sample in a data set, on the basis of the distance between a learning sample and a sample which belongs to each category, similarity is obtained for all the N categories.

Furthermore, in a more preferable embodiment of the present invention, m samples which are close to a learning sample are selected for each category, and the similarity for the category is obtained using the distance between the learning sample and these samples.

Furthermore, in a more preferable embodiment of the present invention, a monotonous decreasing function, in which the similarity decreases as the distance increases, is used as a similarity conversion function for converting the distance from a learning sample to a sample which belongs to each category into similarity.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
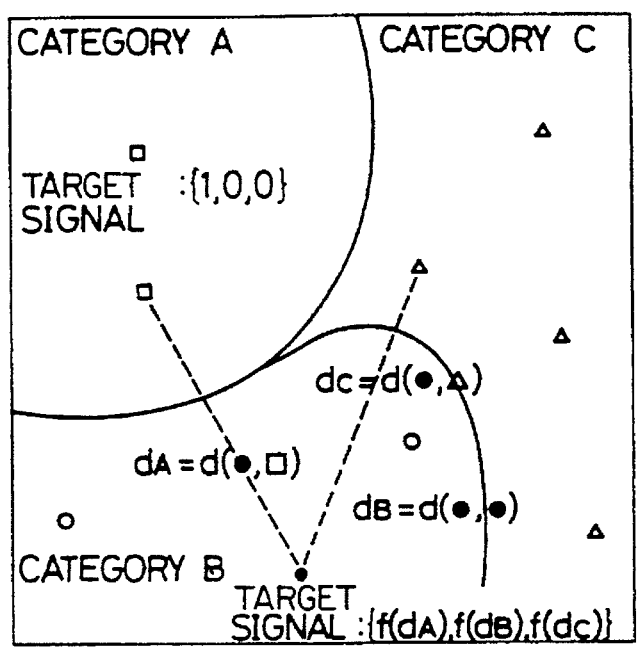
FIG. 1 is a conceptual diagram of a learning method of neural network to which one embodiment of the present invention is applied.
Figure 2:
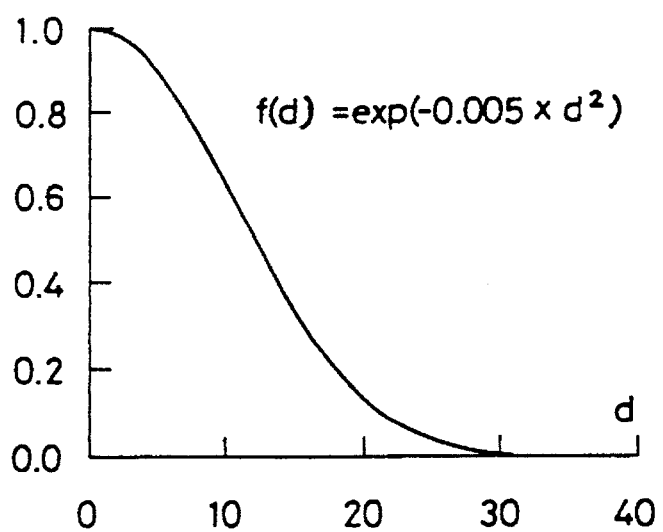
FIG. 2 is a diagram illustrating one example of a similarity conversion function used in the present invention.

FIG. 1 is a diagram for describing the concept of a learning method of a neural network to which one embodiment of the present invention is applied, and FIG. 2 is a diagram illustrating one example of a similarity conversion function used in the present invention.

In a conventional neural network learning method, learning has been made using only a phoneme category of a learning sample as a target signal. For example, in □ shown in FIG. 1, a target signal is {1, 0, 0}. In contrast to this method, in a learning method proposed by the present invention, for each sample, similarity is obtained for each phoneme category corresponding to the distance between the sample and the closest sample included in each phoneme category, the similarity is applied to a neural network as a target signal, and learning is made by the back-propagation. For example, ● in FIG. 1, it is $\{f(d_A), f(d_B), f(d_C)\}$. The function $f(d)=\exp(-\alpha \cdot d^2)$ expressed as a monotonous decreasing function which converts the distance d between samples into similarity (e.g., $f(d)=\exp(-\alpha \cdot d^2)$, $\alpha>0$). Here, one sample at the minimum distance for each category is selected and the similarity for the category is obtained by the distance from the sample. As one example of a similarity conversion function, the monotonous decreasing function $f(d)=\exp(-\alpha \cdot d^2)$, $\alpha>0$ was used herein.

Figure 3:
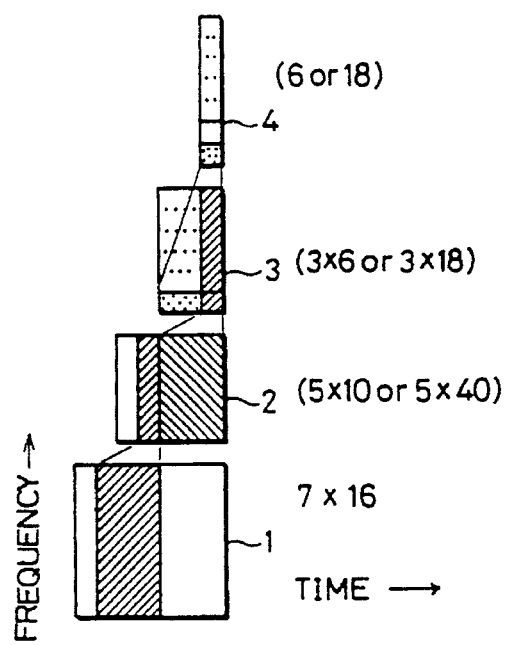
FIG. 3 is a diagram illustrating one example of a neural network to which the present invention is applied.

FIG. 3 is a diagram illustrating one example of a neural network to which the present invention is applied. Referring to FIG. 3, for the neural network, TDNN including an input layer 1 of 7 frames, two hidden layers 2, 3 and an output layer 4 is used, in which data having a time width of 70 ms. The end of every learning sample is adjusted at the center of the input layer.

Figure 4:
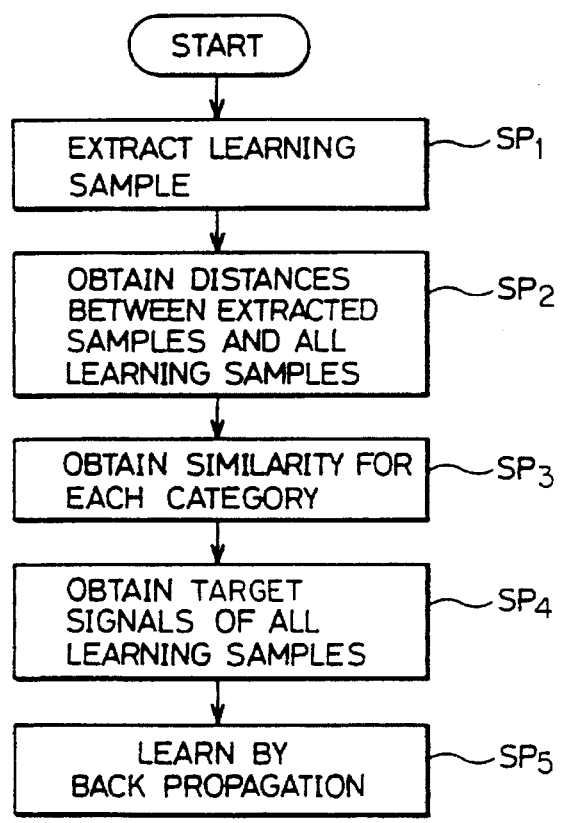
FIG. 4 is a flow chart for describing operation of one embodiment of the present invention.

FIG. 4 is a flow diagram for describing operation of one embodiment of the present invention. Next, the procedure of the learning method of a neural network according to the present invention will be described. First, in step (simply referred to as SP in the figure) SP1, one learning sample is extracted from a learning sample set, and the distances between this sample and all the learning samples are obtained in step SP2. In step SP3, the closest m samples are obtained for each category, and similarity for each category is obtained using the distance from that sample and the similarity conversion function $f(d)=\exp(-\alpha \cdot d^2)$. In step SP4, the similarity for each category is used as a target signal for the extracted learning sample, and it returns to an initial state if target signals are not determined for all the learning samples. Then, when target signals are determined for all the learning samples, in step SP5, the neural network is subjected to learning by the back-propagation using the learning samples and the obtained target signals.

For demonstrating effectivity of the proposed learning method, experiment was performed for identifying phonemes, 6-phonemes /bdgmnN/ and 18-consonants in Japanese. In this learning, phonemes which are cut out from even number ones out of 5240 words stored in a data base are used and phonemes which are cut out from the remaining odd number ones, phrase style utterance and sentence style utterance are used for evaluation. Although M.S.E. (Mean Square Error) and McClelland error were used in a conventional learning method as error functions of the back-propagation, M.S.E. was used in the proposed learning method. The McClelland error is defined as $\ln(1-\epsilon^2)$ ($\epsilon$ is an error between target signal and neural network output value).

The Euclidean distance d of 7 frame data was used as the distance between samples, and $f(d)=\exp(-0.005 \cdot d^2)$ was used as a similarity conversion function this time. The number of learning samples is 1857 samples with the maximum 500 for each category in learning of /bdgmnN/, and 3638 samples with the maximum 250 for each category in the learning of Japanese 18-consonants. The weights of the neural network for experiment were selected from one hundred weight updating in learning, which the identifying rate of phonemes which are cut out from words of odd numbers for evaluation becomes the maximum.

Figure 5:
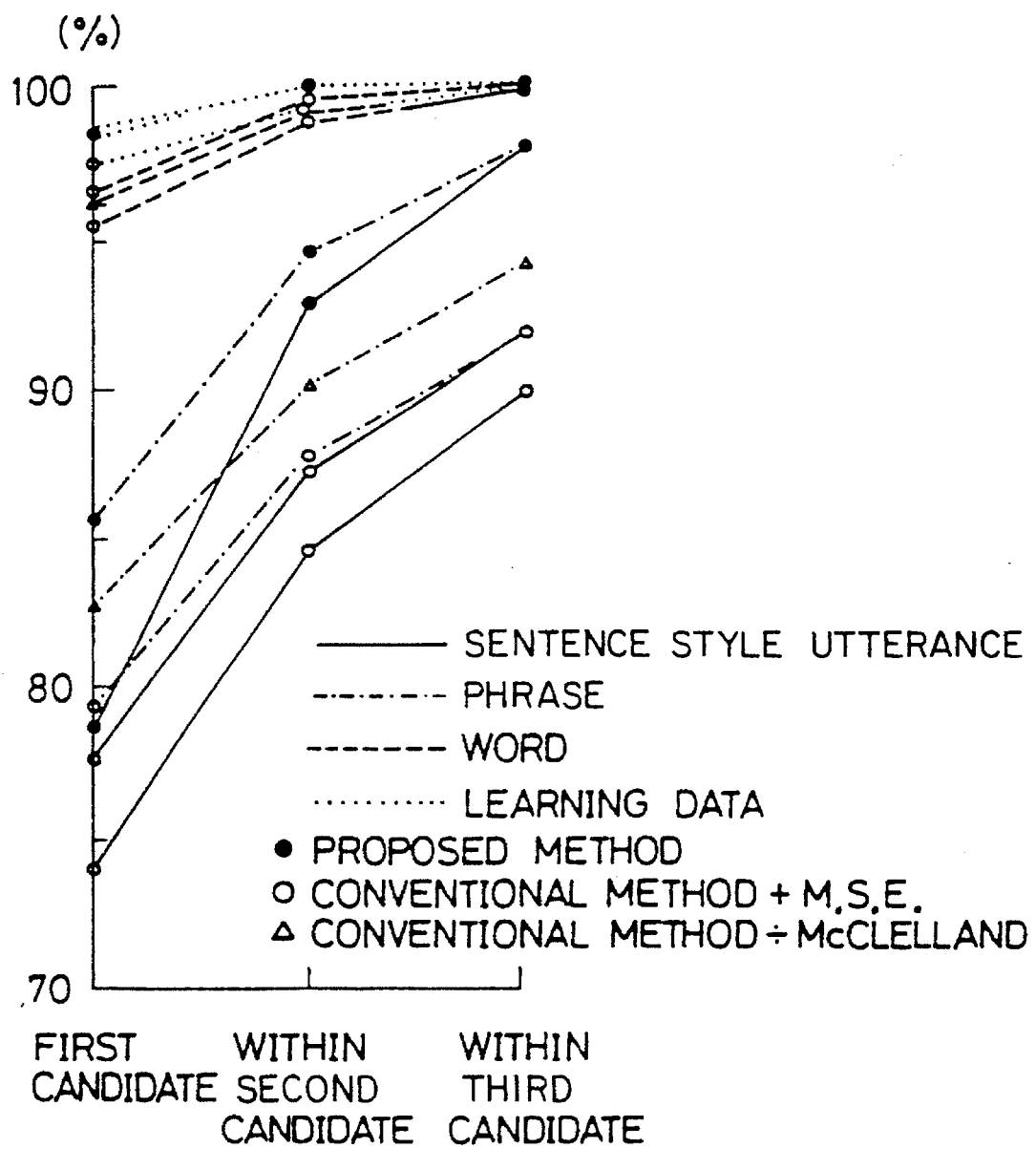
FIG. 5 is a diagram illustrating results of identifying 6 consonants of /bdgmnN/ according to the present invention and a conventional method.
Figure 6:
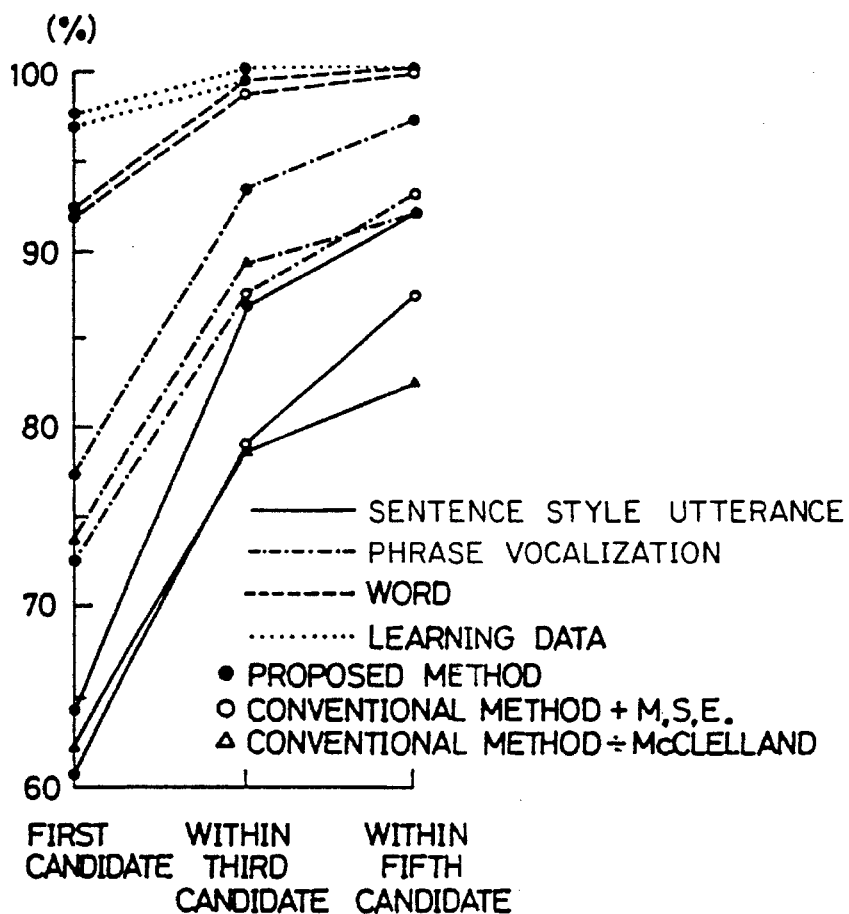
FIG. 6 is a diagram illustrating results of identifying 18-consonants in Japanese according to the present invention and a conventional method.

FIG. 5 shows results of identifying 6-consonants of /bdgmnN/ according to the present invention and a conventional method, and FIG. 6 shows results of identifying Japanese 18consonants according to the present invention and a conventional method.

As clearly seen from FIGS. 5 and 6, in the learning method which is proposed so that the data expressed by ● can be obtained, in all the evaluation data, the accumulated identification results at the first candidate through the N'th candidate (how many correct samples were obtained at respective candidates) were improved. Especially, the result of the N candidate accumulated identification in continuous speech is considerably improved. In the continuous speech (phrase, sentence) recognization, not only the identification result of the first candidate but the N candidate accumulated identification result is extremely important in coupling with language information in speech recognition. Therefore, the improvement shows that the present invention is very effective in phrase and sentence continuous speech recognization.

Figure 7:
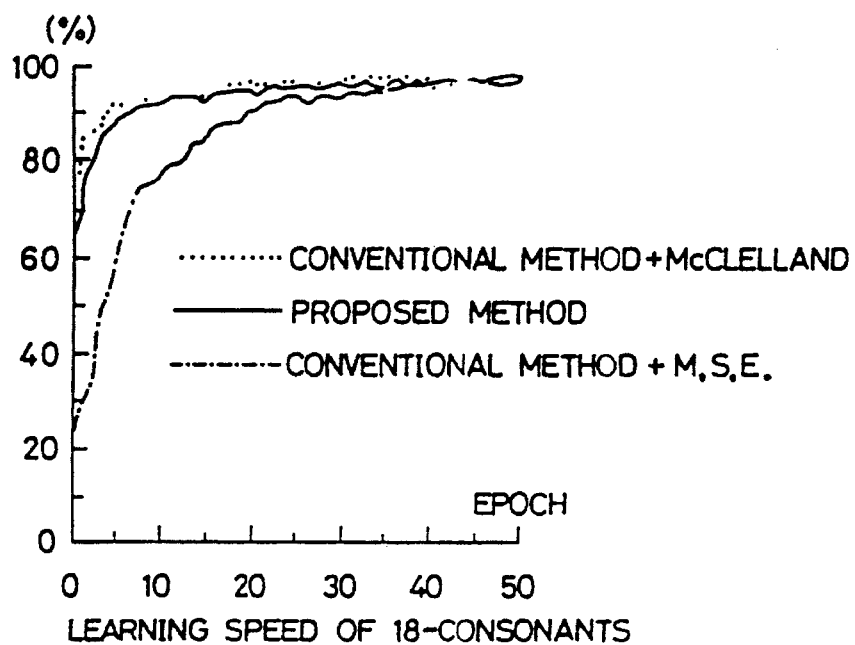
FIG. 7 is a diagram illustrating learning speeds for respective learning methods when identifying 18-consonants in Japanese according to the present invention and a conventional method.

FIG. 7 is a diagram showing a learning speed for each learning method when identifying Japanese 18-consonants by the present invention and a conventional method. In the learning method proposed by the present invention, a speed substantially the same as that in a conventional learning method using McClelland error is shown, and the learning proceeds considerably faster than a conventional learning method using M.S.E. Although the proposed learning method demonstrated a speed substantially the same as that in a conventional learning method where McClelland error was used, it can be seen from the identification results of FIGS. 5 and 6 that the conventional learning method, where McClelland error was used, has the worst performance.

As described above, according to the embodiment of the present invention, the similarity for all the categories was obtained for each sample in a data set and learning of the neural network is performed by the back-propagation using the similarity as a target signal of the neural network, so that learning of neural network is enabled having higher identification ability at the first candidate and the N'th candidate, which results an overall high recognition performance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A learning method of a neural network having a plurality of learning samples, said learning method identifying to which one of N categories each learning sample belongs using a data set consisting of N categories and comprising the steps of:

obtaining in advance similarity for a learning sample for each learning sample in said data set; and performing learning by back propagation using said obtained similarity as a target signal of the neural network.

2. The learning method of a neural network according to claim 1, wherein said step of obtaining in advance similarity includes obtaining similarity of each learning sample in a category on the basis of a distance from said each learning sample to one learning sample in each other category.

3. The learning method of a neural network according to claim 2, wherein said step of obtaining similarity includes, for said each learning sample in each category, selecting m learning samples, each from a different category, which are closest to said each learning sample and obtaining similarity for that category using the distance.

4. The learning method of a neural network according to claim 3, wherein similarity is a function which montonically decreases as the distance between said each learning sample and said m learning samples increases.

\* \* \* \* \*